US012780292B2

(12) United States Patent
Moule et al.

(10) Patent No.: US 12,780,292 B2
(45) Date of Patent: Nov. 3, 2026

(54) HANDWHEEL ACTUATOR ASSEMBLY

(71) Applicant: ZF Automotive UK Limited, Solihull (GB)

(72) Inventors: David Julian Moule, Birmingham (GB); Christos Prevezianos, Birmingham (GB); Harvey Smith, Birmingham (GB)

(73) Assignee: ZF Automotive UK Limited, Solihull (GB)

( * ) Notice: Subject to any disclaimer, the term of this patent is extended or adjusted under 35 U.S.C. 154(b) by 317 days.

(21) Appl. No.: 18/439,824

(22) Filed: Feb. 13, 2024

(65) Prior Publication Data

US 2024/0270303 A1 Aug. 15, 2024

(30) Foreign Application Priority Data

Feb. 13, 2023 (GB) ..................................... 2302020

(51) Int. Cl.
*B62D 5/00* (2006.01)
*B62D 6/02* (2006.01)

(52) U.S. Cl.
CPC ............... *B62D 5/006* (2013.01); *B62D 6/02* (2013.01)

(58) Field of Classification Search
CPC ........ B62D 5/003; B62D 5/005; B62D 5/006; B62D 5/0403; B62D 5/0463; B62D 5/0481; B62D 5/02
See application file for complete search history.

(56) References Cited

U.S. PATENT DOCUMENTS

| | | | | |
|---|---|---|---|---|
| 10,800,443 | B2 * | 10/2020 | Klein | B62D 5/006 |
| 12,391,224 | B2 * | 8/2025 | Karve | B60T 8/1706 |
| 2001/0042655 | A1 | 11/2001 | Dammeyer | |
| 2005/0274565 | A1 | 12/2005 | Greenwell et al. | |
| 2019/0084611 | A1 * | 3/2019 | Klein | B62D 5/006 |
| 2019/0092377 | A1 * | 3/2019 | Shin | B62D 5/0481 |
| 2020/0031390 | A1 * | 1/2020 | Williams | H02K 11/21 |
| 2021/0070361 | A1 | 3/2021 | Erickson et al. | |
| 2023/0068424 | A1 * | 3/2023 | Sun | B62D 5/0469 |
| 2025/0153769 | A1 * | 5/2025 | Prasad | B62D 5/006 |

* cited by examiner

*Primary Examiner* — Maged M Almawri
(74) *Attorney, Agent, or Firm* — Kristin L. Murphy

(57) ABSTRACT

A handwheel actuator assembly for a steer-by-wire system of a vehicle comprises a housing, a shaft rotatably mounted to the housing, the shaft connectable to a handwheel, and one or more motors each having a stator and a rotor. The stator carries a plurality of phase windings and the rotor carries a plurality of magnet poles and is connected to the shaft. A control circuit is adapted to control the current flowing into or out of each motor to cause a net torque to be applied to the shaft during normal operation. The stator of at least one of the motors is configured such that in the event that the control circuit is powered down or disconnected and the handwheel is rotated at 180 degrees per second, the combination of motors overall provides a drag torque of at least 50 percent of the resistance to rotation of the shaft and a torque at the handwheel of at least 2 Nm.

18 Claims, 10 Drawing Sheets

(a)
Soft (b) Not so soft (a)

(b)

(a)

(b)

(c)

HANDWHEEL ACTUATOR ASSEMBLY

CROSS-REFERENCE TO RELATED APPLICATION

This application claims priority to German Priority Application No. 2302020.9, filed Feb. 13, 2023, the disclosure of which is incorporated herein by reference in its entirety.

TECHNICAL FIELD

This disclosure relates to a handwheel actuator assembly for use in a steer by wire system of a vehicle.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver moves and the steered wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor coupled to the steering wheel. The secondary motor provides the driver with the appropriate resistance and feedback in response to specific user inputs at the steering wheel to mimic the feel of a conventional steering system. This secondary motor is connected to a shaft that supports the handwheel through a gearset, and those three parts collectively form a handwheel actuator assembly.

The motors in a steer by wire system are typically constructed with a stator that comprises laminations stacked together in the axial direction. This is both a cost-effective way to manufacture the motors, but also by applying an electrically insulating coating between each lamination in the stack currents are prevented from flowing axially through the stator. This reduces energy losses within the motor as current flowing in that direction is not beneficial to the generation of torque by the motor. Such a prior art motor construction exhibits a low level of drag torque from the elimination, or severe restriction, of the current that flows axially.

The term drag torque as used in this description means a torque that is generated by the motor when it is rotating that opposes any torque that is applied to drive the motor. The rotor of a motor which has all of its phases open circuit with virtually zero drag torque can be spun with only a small amount of external torque applied, one with a very high drag torque will require an equally high or higher external torque to make the stator rotate.

In a steer-by-wire system, a malfunction or failure of a portion of the assembly may impair the ability to steer the vehicle. As a result, it is desirable to provide the assembly with structure for providing at least temporary fail-safe operation. US 2006/0042858 A1 discloses steering apparatus including a steering assembly that includes a handwheel actuator. The handwheel actuator includes a steering column for supporting a steering wheel, a gear mechanism and two motors, each for providing a torque to the steering column. Single motor handwheel actuator assemblies are also known.

When the steer by wire system is powered up and functioning correctly, the HWA imposes torque on the shaft carrying the handwheel that resists the driver turning the steering wheel shaft. For much of the operation of the system, the motor or motors within the handwheel actuator operate as a controlled resistance to the driver. This can be used to give the driver a feel for what is happening at the interface between the road wheels and the road surface that has otherwise been lost with the removal of the mechanical link from the handwheel to the road wheels.

It is undesirable for the hand wheel to be able to rotate freely and a small amount of resistance to movement, which the driver can always overcome is always desirable. Preferably, this resistance to motion is either constant or proportional to the handwheel speed to enable a good steer feel. In the prior art it is known to provide resistance to movement by absorbing energy within the motor drive electronics using a principle known as braking torque. A braking torque is created when there is at least one closed circuit through the motor phases in which current generated as the motor rotates will flow. This requires active control of the motor drive circuit to operate-typically close-appropriate phase switches and force the closed circuit in the motor.

SUMMARY

The applicants have appreciated that it is desirable that this resistance should be present even if the electrical power is removed from the system. Where the resistance is achieved by application of appropriate currents to the motor, this resistance will be removed in the event of a fault where currents cannot be supplied or generated within the motor.

In accordance with a first aspect of the present disclosure, there is provided a handwheel actuator assembly for a steer by wire system of a vehicle comprising:

a housing;

a shaft rotatably mounted with respect to the housing, the shaft connectable to a handwheel;

one or more motors each having a stator and a rotor, the stator carrying a plurality of phase windings and the rotor carrying a plurality of magnet poles and being connected to the shaft;

a control circuit adapted to control the current flowing into or out of the or each motor to cause a net torque to be applied to the shaft during normal operation, and in which the stator of at least one of the motors is configured such that in the event that the control circuit is powered down or disconnected and the handwheel is rotated at 180 degrees per second the combination of motors overall provides a drag torque of at least 50 percent of the resistance to rotation of the shaft and a torque at the handwheel of at least 2 Nm By providing one or more motors where at least one provides a significant and useful level of drag torque, the driver must apply at least 2 Nm at a handwheel speed of 180 degree/second to maintain a constant speed of rotation of 180 degree/second of the handwheel as that resistance must be overcome before any extra torque is used to accelerate the handwheel. This level of resistance is generally considered acceptable in an automotive handwheel actuator application. If it is too low the steering feels too light and may be too easy to turn at high speeds comprising stability, but if too high it may make the steering so heavy the driver may struggle to turn the wheel and maneuver the vehicle.

The disclosure provides a damping of an otherwise uncontrolled rotation without electronics, additional mechanical components or complexity that prevents the steering wheel rotating freely when the power is removed, motor disconnected, or under certain fault conditions that render the control unit electrically inoperative. Removing the need to lose energy in the drive circuit, as is known from the prior art, protects the circuit from damage due to heat build-up and moves the heat loss into the motor where it can better be managed.

The stator of the motor may be configured to cause a drag torque to be generated due to a combination of eddy current, hysteresis and other losses (other losses being commonly referred to as excess losses or anomalous losses) within the stator during use of the motor.

The stator may provide the required levels of drag torque through the inclusion within the stator of one or more electrically conductive closed loop paths through which a varying magnetic flux can flow. In a conventional prior art motor, these axial paths are largely blocked through the use of a laminated stator where each lamination is insulated electrically from the adjacent one.

The stator may comprise a solid stator, for instance formed as unitary element by casting, additive manufacturing, electrical discharge machining, or otherwise machining from billet. The motor may comprise a solid stator which is not laminated. The motor may comprise a set of teeth made from a bonded iron powder.

The solid stator will have higher drag torque compared with a motor that uses a stack of insulated laminated plates for the stator and is otherwise identical.

In an alternative, the stator may comprise a stack of laminations where at least one lamination is each connected electrically to the adjacent lamination or laminations through a low resistance conductive path. Where every lamination is connected this arrangement can provide substantially the same electrical properties as a truly solid stator.

In a further alternative, the stator may comprise two or more axially arranged large thickness laminations that may be connected electrically or spaced by an insulator, each having a thickness measured axially of at least 1 mm or at least 2 mm or at least 4 mm or 5 mm. A prior art laminated stator would use laminations of around 0.5 mm or thinner substantially preventing any axial flux flowing in the stator, Where the stator is formed using a stack of laminations, each spaced from the adjacent lamination or laminations by an electrical insulator, the laminations may be connected by one or more weld lines that extend along the stator in a direction that is substantially orthogonal to the flow of flux and where the weld lines in conjunction with the stator material form a closed electrical path to cause electrical currents to flow in a loop.

In a prior art stator, weld lines are located on the outer circumference of the stator. The location of these weld lines combined with the insulating spacers between laminations prevents much flux from being encircled by a closed conductive loop. The weld lines rigidly secure the laminations together. The inventor has appreciated that these weld lines can be beneficially placed in areas that form a closed conductive loop through which a changing magnetic flux passes as the motor rotates.

The stator may comprise a set of teeth that project inwards from an outer restraining ring towards a rotor that is located concentric to the stator and inside the stator, the weld line or lines being formed on one or both sides of at least one tooth.

The teeth may be integral with the restraining ring, each lamination comprising a ring with inwardly projecting teeth.

The stator of the motor may be configured to provide a drag torque that increases more rapidly with speed of rotation of the shaft compared with an otherwise identical motor that has an optimally reduced drag torque though the use of electrical steel and a laminated stator where each lamination is insulated from the adjacent lamination.

The motor may include a stator that is constructed and arranged so that when compared with a stator made from a laminated structure comprising laminations of electrical steel M470-50A according to the European (EN) and German (DIN) standard DIN EN 10106:2016-03, tilled "Cold rolled non-oriented electrical steel strip and sheet delivered in the fully processed state" for non-orientated electrical steel (hereinafter referred to the M470-50A specification) and with laminations electrically insulated from each other, the drag torque contributed by the stator is at least 4 times greater when the handwheel is rotated at 180 degrees/s.

The motor may be so constructed and arranged to provide at least 10 times greater drag torque when the handwheel is rotated at 180 degree/s than a motor that is identical apart from using stator laminations comprising electrical steel laminations glued together meeting the M470-50A specification The above definitions of the property of the handwheel actuator assume that the effect of mechanical friction in resisting rotation of the handwheel are negligible. In practice they will not be negligible and may in fact dominate at very low handwheel rotational speeds. Of course, at very low rotational speeds of the handwheel the drag torque generated will be lower than at higher speeds but provided the required drag torque is achieved at handwheel speeds of 180 degree/sec or higher this is considered to be generally acceptable.

Looked at another way, the motor stator of the handwheel actuator may be configured such that the motor stator assembly excluding copper windings has an effective loss per mass of at least 30 Watts per kg. This is a figure that is greater than any standard electrical steel as used in electrical machines and for example existing automotive electric assisted steering assemblies.

The motor may be configured to provide at least 60 percent of the resistance to rotation for at least one speed in the range, or at least 70 percent, or 80 percent, or substantially all of the drag torque over a range of non-zero rotational speeds. The motor may provide all or substantially all of the resistance to a driver rotating the handwheel and hence rotating the shaft, by which we mean at least an order of magnitude larger than any resistance provided by mechanical friction present in the assembly. This friction will occur within bearings and in the meshing of the teeth of the gears.

The motor may be configured to provide at least 2 Nm of drag torque over a substantial range of non-zero rotational speeds of the handwheel.

The motor may be configured to provide at least 3 Nm of drag torque for at least one non-zero handwheel speed within the normal operational range, or at least 5 Nm or more.

The motor may comprise a stator that comprises a lossy steel that does not meet the loss (W/kg) requirements of the M470-50A standard.

The steel may comprise a low silicon content steel, and may have less than 1 percent silicon by weight.

An example of a steel that may be used to form a stator of the handwheel actuator assembly of the disclosure in which the drag torque is generated predominantly due to eddy current losses is a free machining mild steel such as EN1A or ASTM 1215.

An example of a steel that may be used to form a stator of the handwheel actuator assembly of the disclosure in which the drag torque is generated predominantly due to hysteresis losses is a C75 carbon spring steel which may be provided in the form of 0.5 mm thick sheets.

The steel stator material may have at least 20 times the coercivity, or at least 30 times the coercivity, electrical steel such as M470-50A.

The material from which the stator is manufactured may have a specific total loss when excited with a sinusoidal flux density of amplitude 1 Tesla and frequency of 50 Hz greater than 30 W/kg, when tested according to the ASTM standard A927/A927M-11 (Standard Test Method for Alternating-Current Magnetic Properties of Toroidal Core Specimens Using the Voltmeter-Ammeter-Wattmeter Method).

The motor may comprise a solid stator which is not laminated. The whole stator may be one solid block, or the stator may comprise separate teeth which are solid and formed as unitary element extending axially along the rotor and which are not laminated. These teeth may be fixed together to form the stator.

This will have higher drag torque compared with a motor that uses a stack of insulated laminated plates for the stator and is otherwise identical. This may use electrical steel of a more lossy steel of the kind set out above.

Alternatively, the motor may comprise a laminated stator formed from a stack of relatively thin metal plates in which at least a partial face to face direct contact is provided between two or more adjacent plates in the stack.

The stack may comprise uncoated steel plates that are in direct contact for some or all of the plates.

By using a solid stator or a stack of laminated plates that are in contact, current can flow axially providing a higher drag torque compared with a conventional insulated laminated stator.

Electrical steel plates are commonly supplied with an insulating coating such as C-4 or C-5 (according to AISI insulation designations) which reduce the flow of electrical eddy currents between plates The stator of the handwheel of the present disclosure may comprise laminations of steel that are coated with an electrically conductive protective coating. The protective coating may provide protection against rusting of the steel. An example of a suitable coating is tin, another example is zinc.

The torque drag of the motor may provide at least 60 percent, or at least 70 percent or higher of the resistance to rotation of the shaft at 180 degrees/second speed of rotation of the shaft. It may provide all or substantially all of the resistance to a driver rotating the handwheel and hence rotating the shaft, by which we mean at least an order of magnitude larger than any resistance provided by mechanical friction present in the assembly. This friction will occur within bearings and in the meshing of the teeth of the gears.

The handwheel actuator may include a gearbox comprising a first gear fixed relative to the shaft and a second gear fixed relative to the output of the motor, rotation of the first gear causing a rotation of the second gear.

The two gears may be directly meshed or may be connected to each other through a belt. The handwheel actuator may comprise a second gear connected to and configured to rotate with the shaft; and a second motor having an output driving a respective second output gear, the second output gear being engaged with the first gear and hence the shaft.

This second motor may also generate a significant drag torque such that the sum of the drag torque from both motors provides a substantially resistance to the turning of the handwheel when the motor is unpowered.

Alternatively, the second motor may have a more conventional construction using electrical steel as the rotor so that it does not play a significant role in the overall resistance to rotation when unpowered. The first motor may therefore provide considerably more drag torque compared to the second for instance at least double the drag torque.

The motor may comprise a brushless permanent magnet type motor comprising a rotor and a stator having many windings surrounding regularly circumferentially spaced teeth.

The shaft may be connectable to a handwheel directly through a splined connector on an end of the shaft fitting in an internally splined connector of the handwheel. The shaft will therefore rotate at the same speed as the handwheel. The motors if directly connected to the shaft will also rotate at the same speed. If the motors are connected to the shaft through a gearbox, they will rotate at a different speed to the handwheel.

Alternatively, the shaft may be connected to the handwheel through a gearbox. In this case the rotational speed of the shaft may differ from the rotation speed of the handwheel.

BRIEF DESCRIPTION OF DRAWINGS

There will now be described by way of example only one exemplary arrangement of the present disclosure with reference to and as illustrated in the accompanying drawings of which.

DETAILED DESCRIPTION

Figure 1:
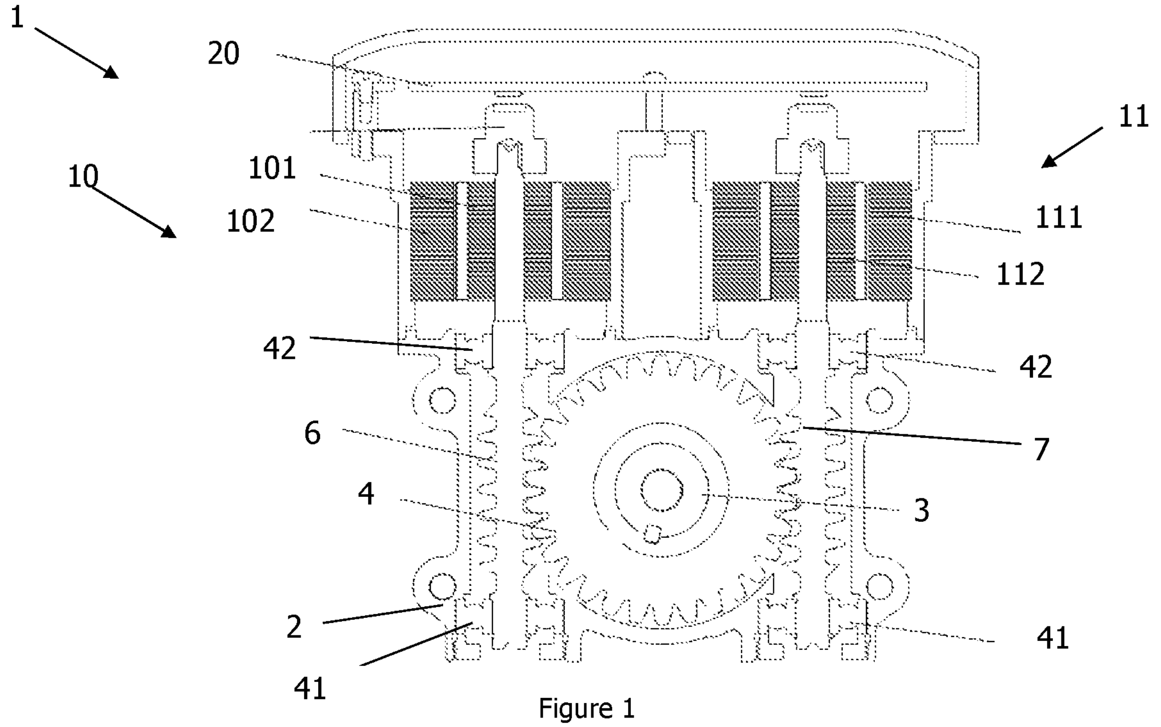
FIG. 1 shows the key mechanical components of an exemplary arrangement of a handwheel actuator assembly according to an aspect of the disclosure.

FIG. 1 shows a handwheel actuator (HWA) assembly of a vehicle, according to a first aspect of the disclosure. This example is a dual motor assembly which has two motors, each connected to a common shaft through a respective gearbox. The disclosure can be implemented with a single motor and also without the presence of a gearbox by direct connection of the motor rotor to the shaft.

The assembly 1 includes a first motor 10 with rotor 101 and stator 102 and a second motor 11 with rotor 111 and stator 112, the first motor 10 being connected to a first worm gear 6 and the second motor 11 being connected to a second worm gear 7. Each worm gear 6, 7 comprises a threaded shaft arranged to engage with a gear wheel 4 connected to a steering column shaft 3 such that torque may be transferred from the worm gears 6, 7 to the gear wheel 4 connected to the steering column shaft 3. The gear wheel 4 is operatively connected to a driver's handwheel (not shown) via the steering column shaft 3. In this example, each of the two motors 10, 11 are brushless permanent magnet type motors and each comprise a rotor 101, 111 and a stator 102, 112 having many windings surrounding regularly circumferentially spaced teeth. The arrangement of the two motors 10, 11, the shaft 3, the worm gears 6, 7 and the wheel gear 4 together form a dual motor electrical assembly.

Each of the two motors 10, 11 are controlled by an electronic control unit (ECU) 20. The ECU 20 controls the level of current applied to the windings and hence the level of torque that is produced by each motor 10, 11.

In this example, the two motors 10, 11 are of a similar design and produce a similar level of maximum torque. However, it is within the scope of this disclosure to have an asymmetric design in which one motor 10, 11 produces a higher level of torque than the other 10, 11.

One of the functions of a handwheel actuator (HWA) assembly is to provide a feedback force to the driver to give an appropriate steering feel. This may be achieved by controlling the torque of the motors 10, 11 in accordance with signals from the handwheel actuator (such as column angle) and from other systems in the vehicle (such as vehicle speed, rack angle, lateral acceleration and yaw rate).

The use of two motors 10, 11 is beneficial in eliminating rattle. If a single electric motor were instead used in a torque feedback unit, the motor may be held in locked contact with the gearing by means of a spring. However, in certain driving conditions the action of a spring is not sufficiently firm, which allows the gears to "rattle" during sinusoidal motions or sharp position changes of the steering column.

Use of two motors 10, 11 which can be actively controlled (as in the present exemplary arrangement) ameliorates the problems associated with use of a single motor. In this arrangement, both motors 10, 11 are controlled by the ECU 20 to provide torque feedback to the steering column and to ensure that the worm shafts 6, 7 of both motors 10, 11 are continuously in contact with the gear wheel 4, in order to minimise rattle. The use of two motors 10, 11 in this way also allows active management of the friction and thereby the feedback force to the driver.

As shown in FIG. 1, the motors 10, 11 are received in and secured to a transversely extending two-part extension of a housing 2. The worm shaft 6, 7 of each motor is supported relative to the housing by two sets of bearings. A first set of bearings 41 supports a first end of each worm shaft 6, 7 distal their respective motor 10, 11 while a second set of bearings 42 supports a second end of each worm shaft 6, 7 proximal their respective motor 10, 11.

Figure 2:
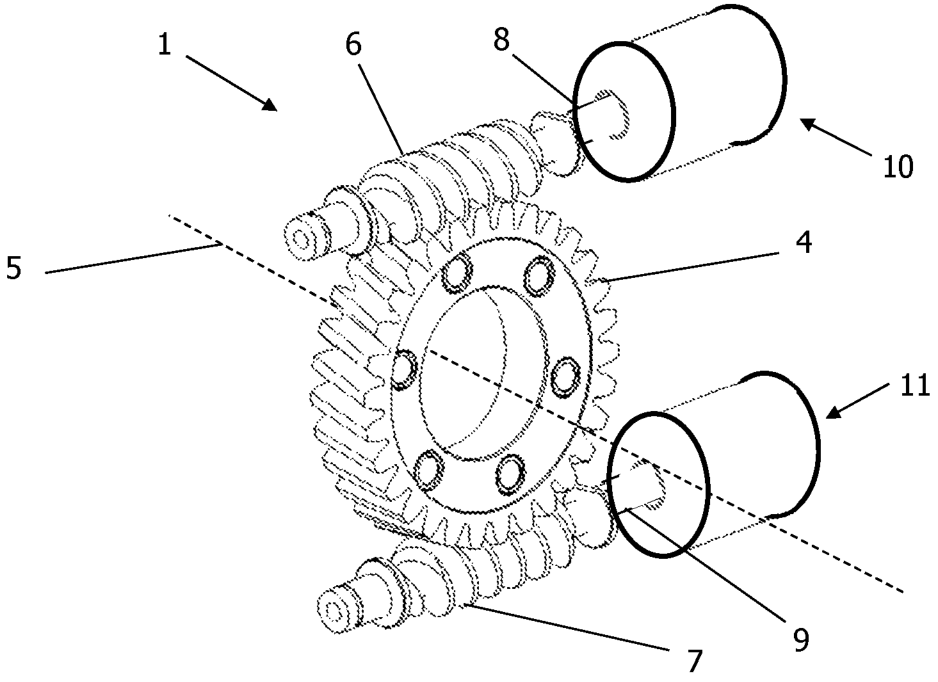
FIG. 2 shows another exemplary arrangement of a handwheel actuator assembly according to an aspect of the disclosure.

FIG. 2 shows an axis of rotation of the shaft 3 marked using a dashed line 5, extending perpendicularly through the gear wheel 4. The periphery of the gear wheel 4 is formed as a worm gear which meshes with each of two identical worm screws 6, 7 located on opposite sides of the longitudinal axis 5 of the shaft 3. Each worm screw 6, 7 is connected to the output shaft 8, 9 of a respective electric motor 10, 11.

The axes of the output shafts 8, 9 of the two motors 10, 11 are arranged perpendicularly to the rotational axis of the shaft 3 and the axes of the two motors may also be inclined with respect to each other, to reduce the overall size of the assembly.

The motors 10, 11 are controlled by the electronic control unit (ECU) 20 such that at low levels of input torque applied to the shaft 3 by the handwheel, the motors 10, 11 act in opposite directions on the gear wheel 4 to eliminate backlash. At higher levels of input torque applied to the shaft 3 by the handwheel, the motors 10, 11 act in the same direction on the gear wheel 4 to assist in rotation of the shaft 3. Here, a motor 10, 11 acting in 'a direction' is used indicate the direction of torque applied by a motor 10, 11 to the gear wheel 4.

The use of two separate motors 10, 11 which can be controlled in a first operational mode to apply torque in opposite directions to the gear wheel 4 eliminates the need to control backlash with precision components. In addition, the use of two separate motors 10, 11 which can be controlled in a second operational mode to apply torque in the same direction to the gear wheel 4 allows the motors 10, 11 and gear components 4, 6, 7 to be specified at half the rating of the required total system torque, thereby reducing the size and cost of the drive assembly 1.

In the exemplary arrangement shown in FIGS. 1 and 2, the worm shafts 6, 7 engage diametrically opposed portions of a gear wheel 4. The threads of the worm shafts 6, 7 each have the same sense, i.e., they are both left-handed screw threads. The motors 10, 11 are configured such that they lie on the same side of the gear wheel 4 (both motors 10, 11 lie on one side of a virtual plane perpendicular to axes of the worm shafts 6, 7 and passing through the centre point of the gear wheel 4). Considering as an example the perspective shown in FIG. 2, driving both motors 10, 11 clockwise would apply torque in opposite directions to the gear wheel 4, with motor 10 applying a clockwise torque to gear wheel 4 and motor 11 applying an opposing anti-clockwise torque to gear wheel 4.

FIG. 2 shows another exemplary arrangement of a handwheel actuator assembly 1 according to the first aspect of the disclosure. This arrangement is substantially similar to the arrangement shown in FIGS. 1 and 2 with the only difference being the positioning of the motors 10, 11. Components and functional units which in terms of function and/or construction are equivalent or identical to those of the preceding exemplary arrangement are provided with the same reference signs and are not separately described. The explanations pertaining to FIG. 1 therefore apply in analogous manner to FIG. 3 with the exception of the positioning of the two motors 10, 11.

In FIG. 2 the worm shafts 6, 7 engage diametrically opposed portions of a gear wheel 4 and threads of the worm shafts 6, 7 each have the same sense, i.e., in this example, they are both right-handed screw threads. The motors 10, 11 are configured such that they lie on opposing sides of the gear wheel 4 (motor 10 lies on one side of a virtual plane perpendicular to axes of the worm shafts 6, 7 and passing through the centre point of the gear wheel 4 while motor 11 lies on the other side of this virtual plane).

Application of torque by a driver in a clockwise direction results in rotation of the handwheel 26 and the steering column shaft 3 about the dashed line 5. This rotation is detected by a rotation sensor (not shown). The first motor 10 is then controlled by the ECU 20 to apply torque in the opposite direction. In a first operational mode, the second motor 11 is actuated by the ECU 20 to apply an offset torque 32 in the opposite direction to the torque 30 of the first motor 10 to reduce gear rattling. Alternately, in a second operational mode, the second motor 11 is actuated by the ECU 20 to apply a torque 34 in the same direction to the torque 30 of the first motor 10 to increase the feedback torque to the steering column shaft 3.

The net result of the torques by the first and second motors 10, 11 results in an application of a feedback torque to the steering column shaft 3 and handwheel 26, to provide a sensation of road feel to the driver. In this example, the application of a feedback torque is in the opposite direction to that applied to the handwheel 26 by the driver. In this way, the "rattle" produced between the worm shafts 6, 7 and the gear wheel 4 can be eliminated or significantly reduced.

Figure 3:
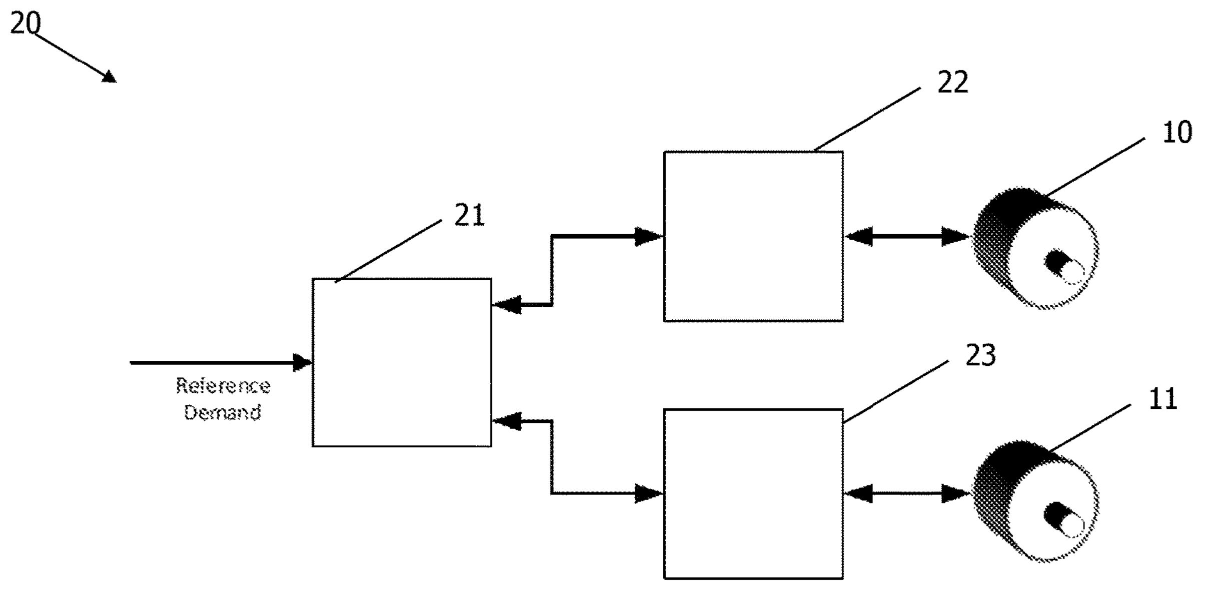
FIG. 3 shows a general arrangement of an electronic control unit which controls the two motors of a dual motor drive assembly according to a first aspect of the disclosure.

FIG. 3 reveals part of an HWA assembly 80 showing a general arrangement of an electronic control unit (ECU) 20 which controls each of the two motors 10, 11. The ECU 20 may include a hand wheel actuator (HWA) control system 21 as well as a first and second motor controller 22, 23 which control the first and second motors 10, 11 respectively. A reference demand signal is input to the HWA control system 21 which allocates torque demands to each of the first and second motors 10, 11. These motor torque demands are converted to motor current demands and transmitted to the first and second motor controllers 22, 23. Each motor 10, 11 provides operating feedback to their respective motor controller 22, 23. The HWA control system 21 is configured to calculate the magnitude of mechanical friction using the motor torque demands. In another exemplary arrangement, the HWA control system 21 may be implemented by a separate ECU to the first and second motor controller 22, 23.

Figure 4:
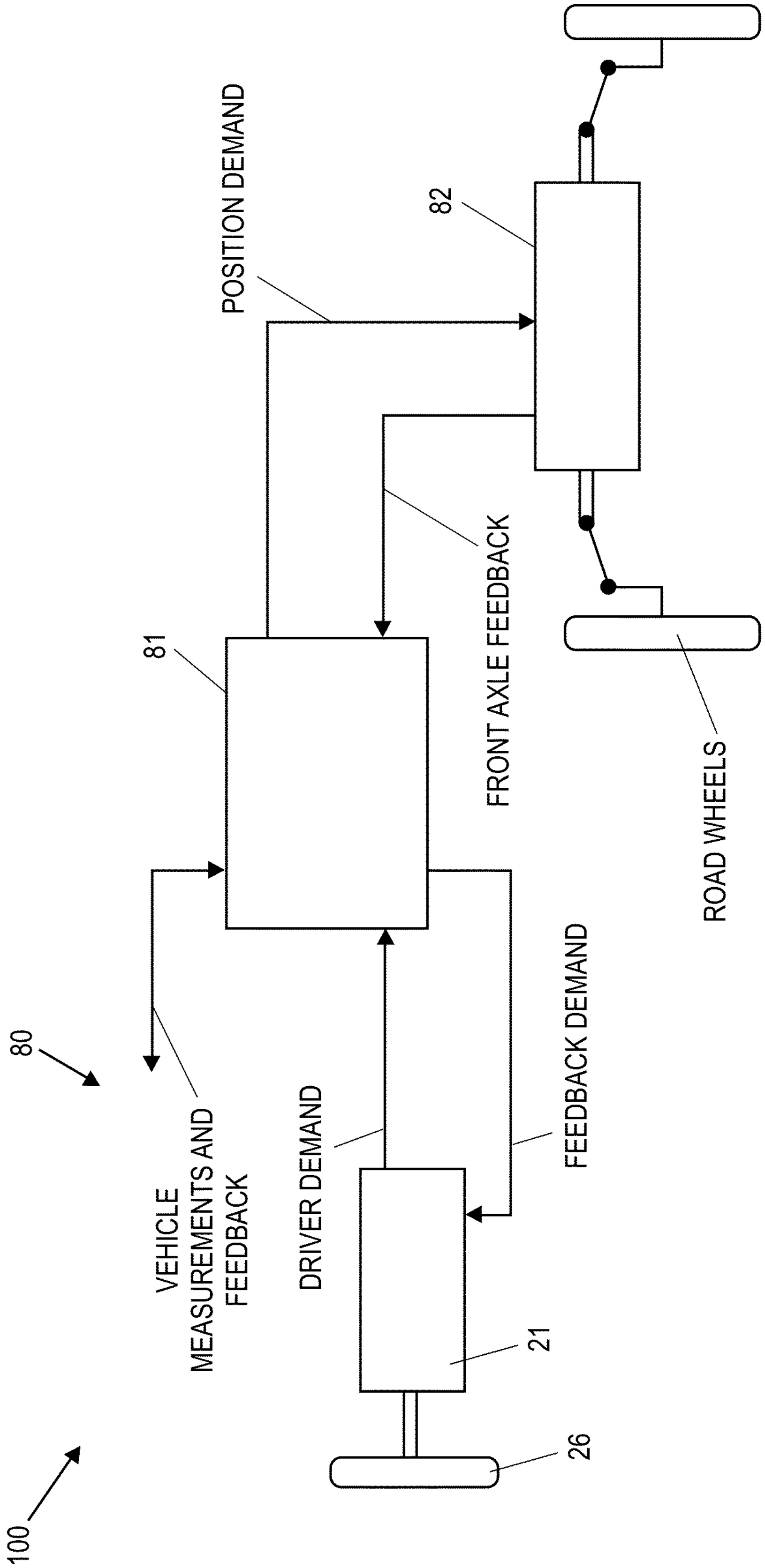
FIG. 4 shows a layout of a Steer-by-Wire system including a dual motor drive assembly according to a first aspect of the disclosure.

FIG. 4 shows an overall layout of a Steer-by-Wire system 100 for a vehicle including the handwheel actuator (HWA) assembly 80 according to a first aspect of the disclosure. The HWA assembly 80 supports the driver's handwheel 26 and measures the driver demand which is usually the steering angle. A steering controller 81 converts the driver demand into a position demand that is sent to a front axle actuator (FAA) 82. The FAA 82 controls the steering angle of the roadwheels to achieve the position demand. The FAA 82 can feedback operating states and measurements to the steering controller 81.

The steering controller 81 combines the FAA 82 feedback with other information measured in the vehicle, such as lateral acceleration, to determine a target feedback torque that should be sensed by a driver of the vehicle. This feedback demand is then sent to the HWA control system 21 and is provided by controlling the first and second motors 10, 11 with the first and second motor controllers 22, 23 respectively.

FIG. 4 shows the steering controller 81 as physically separate to both the HWA controller 21 and the FAA 82. Alternately, different architectures, where one or more of these components are physically interconnected, may be used within the scope of this disclosure. For example, the functions of the steering controller 81 may be physically implemented in the HWA controller 21, the FAA 82, or another control unit in the vehicle, or some combination of all 3. Alternatively, control functions ascribed to the HWA controller 21 and FAA 82 may be partially or totally implemented in the steering controller 81.

In the event that there is a fault in the motor windings that prevents any current flowing through the motor, or disconnection of motor from the control electronics, or in the motor drive stage or in the control system, including a loss of electrical power to the handwheel assembly, it becomes impossible to control the rotation of the handwheel by the driver in order to provide feedback. The motors of the handwheel actuator assembly of FIG. 1 are configured in order to ensure that there is some damping of the rotation of the wheel in this condition. This is beneficial as it will feel more natural to the driver and will also help them not make steering inputs at too high a rate by damping their actions.

In a conventional prior art handwheel actuator assembly, the motor is fabricated using a high-performance electrical steel for the stator as it is generally desirable to reduce the level of drag torque and the resulting energy losses. Further reductions are attained by the use of a laminated stator in which electrical steel plates are held apart by interleaved layers of insulating material.

In the exemplary arrangement of FIG. 1 and the exemplary arrangement of FIG. 2 the two motors are the same and each is configured to provide a substantial level of drag torque when a driver rotates the motor in an unpowered condition by rotating the handwheel. This ensures the handwheel does not spin freely in the event of a fault that removes power from the motor or where the motor has an internal fault that means the current in the windings does not generate any motoring torque in the motor. An added benefit is that more energy is consumed within the motor compared with a low drag torque motor and so there is less for the electronics to do to provide a controlled resistance, heat being dissipated within the motor rather than from the electronics.

The skilled person will understand that the disclosure can be implemented with only one of the motors providing a substantial drag torque and the other a conventional motor used in prior art handwheel actuators with a low drag torque.

By drag torque we mean the torque arises due to energy conversion within the stator of the motor as it is rotating. Mechanical energy from the driver causes the rotor to rotate. As it rotates the rotor and stator interact magnetically generating a changing flux within the stator. This will give rise to both eddy currents and hysteresis losses and electrical energy is converted to heat as these currents pass through the resistive material forming the stator. Thus, mechanical energy is converted heat and a drag torque results.

Figure 9:
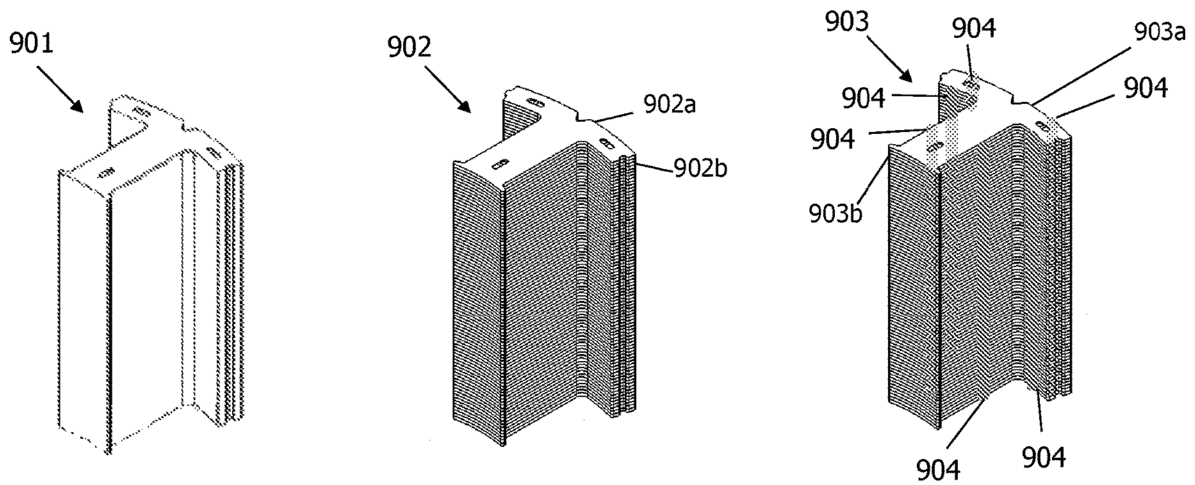
FIGS. 9(*a*) to (*c*) show three different configurations of stator tooth that may be used in the example handwheel actuators assemblies of FIGS. 1 and 2 that each provide a high level of drag torque that prevents free rotation of the handwheel due to losses in the stator.
Figure 10:
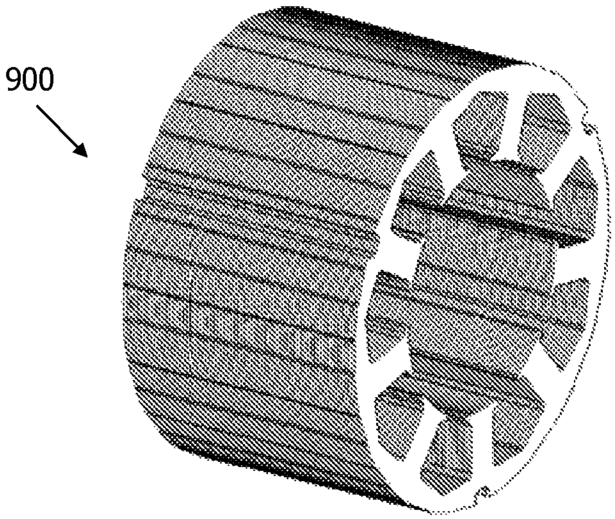
FIG. 10 shows a complete stator assembly consisting of 9 teeth protruding from an annular ring.

The motors of FIG. 1 and FIG. 2 may utilise one of several different configurations of stator teeth 900 as shown in FIGS. 9(*a*) to 9(*c*). A plurality of stator teeth 900,901,902 are assembled adjacent to each other to form a complete stator 910 of the form shown in FIG. 10. Whilst FIG. 10 shows a stator 910 formed from unitary laminations containing the profile of all 9 teeth, individual teeth facilitate easier winding of the motor. The benefits of each configuration of FIG. 9 are set out later in this description. Each configuration provides for a high level of drag torque from the motor although the way they achieve this differs for each one.

Figure 5:
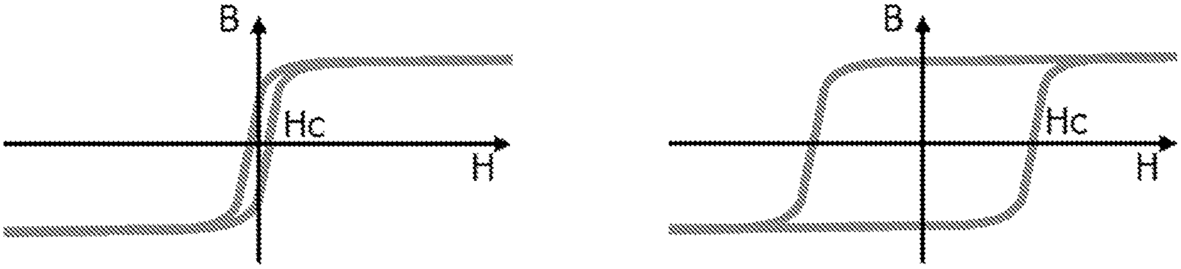
FIGS. 5 (*a*) and (*b*) are B-H curve plots of flux density, B against Magnetizing force H for a soft steel such as electrical steel and a not so soft steel such as carbon steel.

Drag torque arises for a number of reasons with the two primary reasons being hysteresis within parts of the motor stator and the formation of eddy currents. FIG. 5 illustrates this for a generic soft material such as electrical steel and for a generic not so soft material such as carbon steel that may be used to form the stators in the motors of FIG. 1 or FIG. 2. In each plot the area enclosed represents the loss arising from the magnetic domains reversing—the more times the steel is magnetised north & south, the larger the loss, and therefore the larger the drag torque. Steel with low hysteresis loss performs as shown in FIG. 5(*a*) and has a narrow hysteresis loop, steel with high hysteresis loss is shown in FIG. 5(*b*) and has a wider hysteresis loop and a motor fabricated using the later will have more drag torque due to more hysteresis loss.

Figure 6:
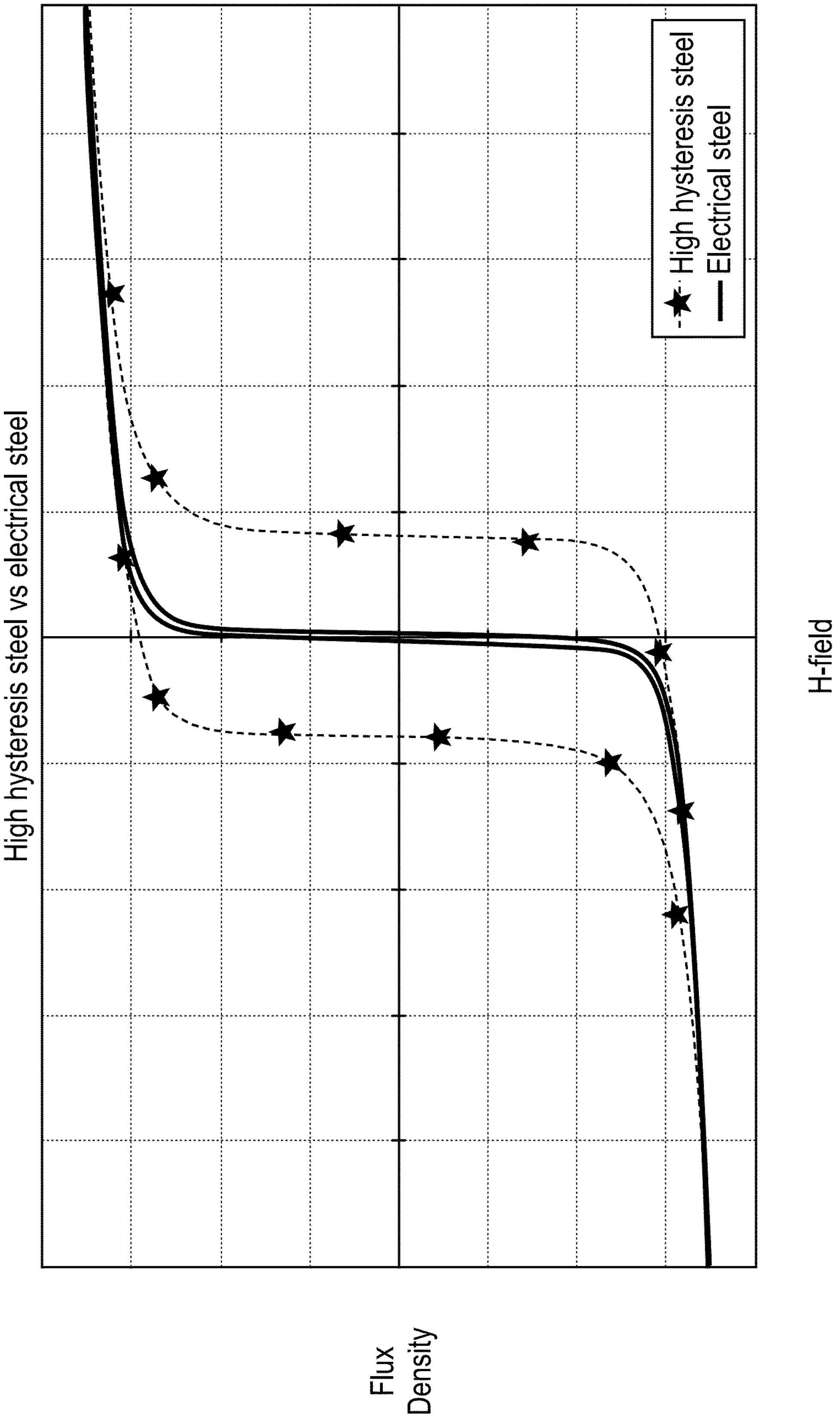
FIG. 6 is a plot showing the B-H curve for a chosen non-electrical steel used in the motors of the embodiments of FIG. 1 and FIG. 2 against the plot for an electrical steel.

FIG. 6 illustrates the different B-H curves of a high hysteresis steel chosen for the motors of the examples of FIGS. 1 and 2, 9 and FIG. 10, and an electrical steel that meets the M470-50 specification. The reference steel is one that falls within the specification of an electrical steel defined. The other is a more lossy steel and not so soft steel such as spring steel. The not so soft steel has considerably more hysteresis. The carbon steel measured in the graph shows approx. 30 times the coercivity and thus much higher drag torque than the electrical steel.

Figure 7:
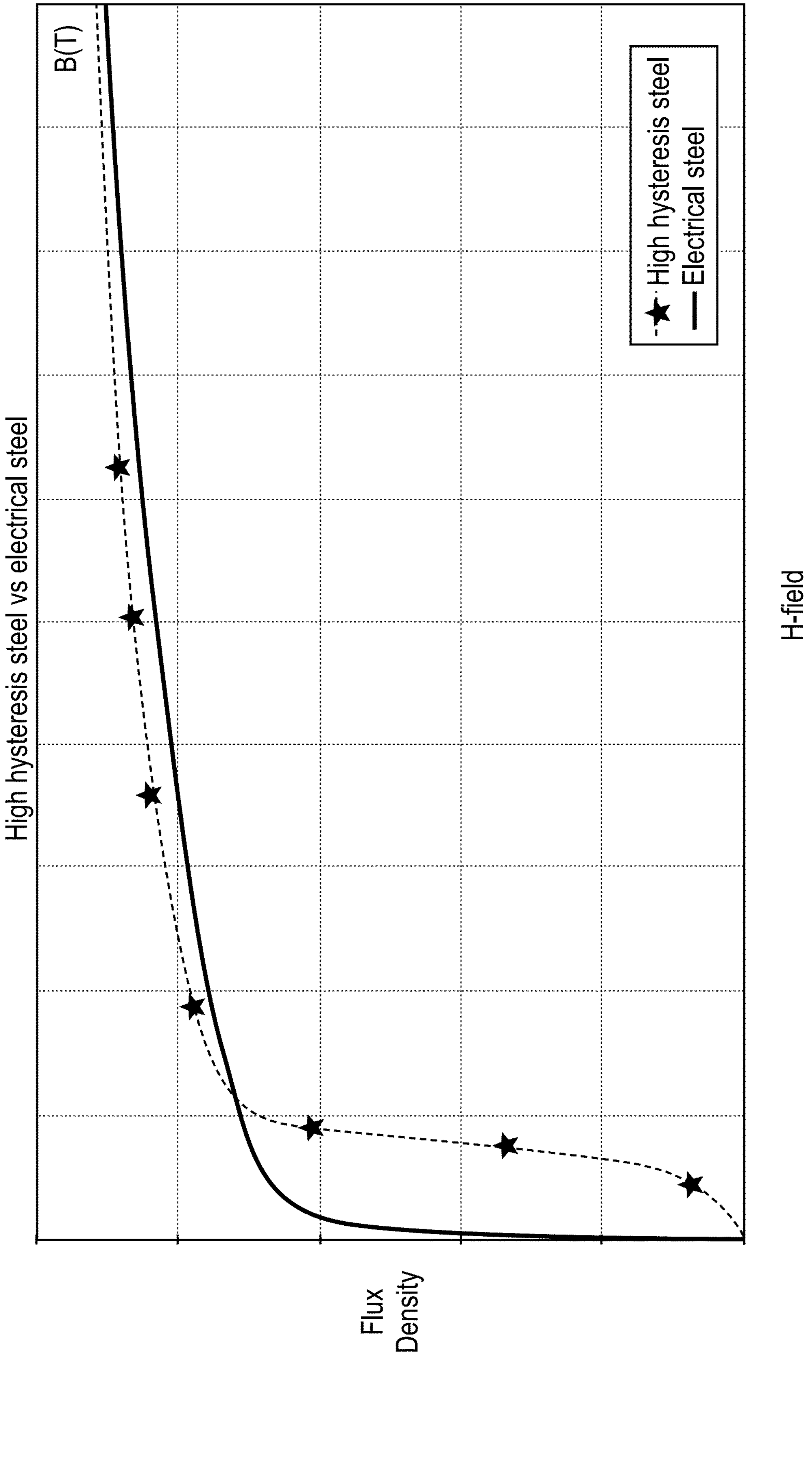
FIG. 7 is a plot showing the increase in overall flux from the motors when constructed using the non-electrical steel versus an electrical steel.

As shown in FIG. 7, the same spring steel at the flux densities of interest within a practical motor reaches at least as high flux density as the electrical steel, giving similar motor performance.

FIG. 9(*a*) shows a stator tooth 901 that has a solid construction from top to bottom rather than a laminated one, allowing a lot of current to flow axially along the stator. As such the level of drag torque provided by each motor using a stator formed from a solid tooth 901 of FIG. 9(*a*) will be higher than a prior art handwheel actuator assembly with a stack of insulated laminations in the stator. To increase the drag torque further a steel having inherently higher hysteresis loss than typical electrical steel through the alloy content can be used. The use of a solid block results in a lower resistivity compared with a laminated stator. Carbon in steel generally increases the hysteresis loss.

The stator tooth of FIG. 9(*b*) uses an alternative configuration in which each tooth 901 of the stator is made up of laminations 901*a*, the top two only being labelled for clarity and only the topmost lamination fully visible. Each one is electrically connected to the adjacent one because there are no insulating layers between the laminations. This stack acts the same as the solid stator allowing current to flow axially between laminations and increasing the magnitude and of eddy currents in the motor. More eddy currents mean higher losses and more torque drag. To prevent the steel laminations oxidising (rusting) they are provided with an electrically conductive protective coating such as tin or zinc.

FIG. 9(*c*) shows another motor stator tooth arrangement in which each tooth 902 comprises laminations 903*a*,903*b*, the top two only being labelled for clarity and only the topmost lamination fully visible. However, unlike the teeth 902 in FIG. 9(*b*) each lamination is insulated from the others in a conventional manner. The layers may comprise electrical steel or a more lossy steel with each layer given an electrically insulating coating. To provide the desired paths along which substantial amounts of current can flow in an axial direction in the motor, the laminations are fixed together by a number of weld lines 904. Each line 904 is located on the side of a tooth of the stator as this is a region where high flux densities are present. The weld lines both help retain the shape of the stator and also provide for axial current paths. Whilst FIG. 9*c* shows three sets of weld lines creating a corresponding set of closed conductive loops, those skilled in the art will be aware of many possible arrangements for creating closed conductive loops encircling parts of the stator where magnetic flux changes when the rotor moves. In FIG. 9*c* the conductive loops are formed by both the weld lines and the stator laminations.

Figure 8:
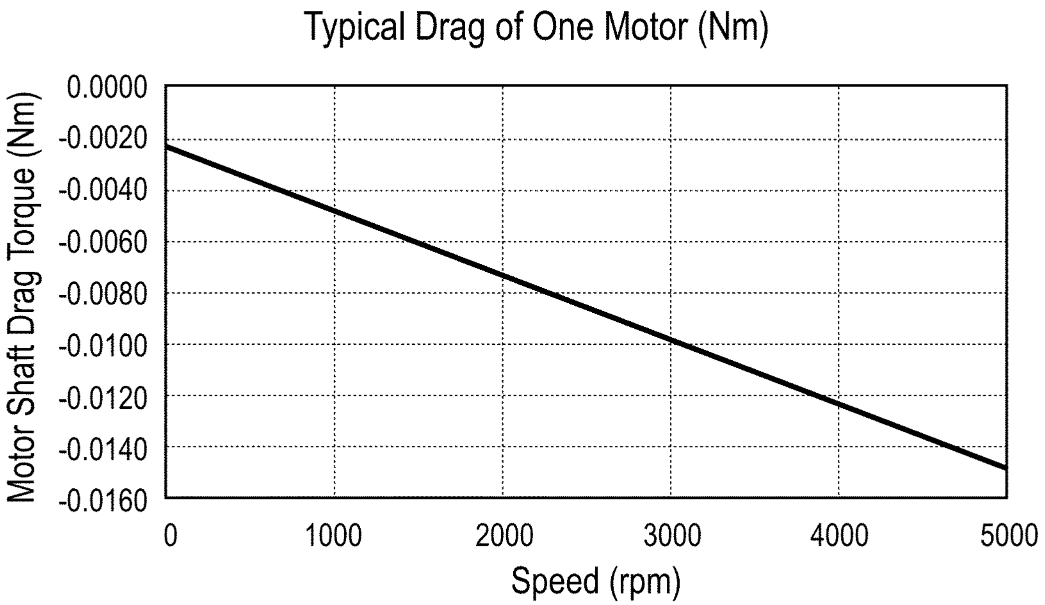
FIGS. 8 (*a*) and (*b*) are plots comparing the drag torque versus motor speed for the non-electrical steel stator motor against a prior art motor of electrical steel.
Figure 8:
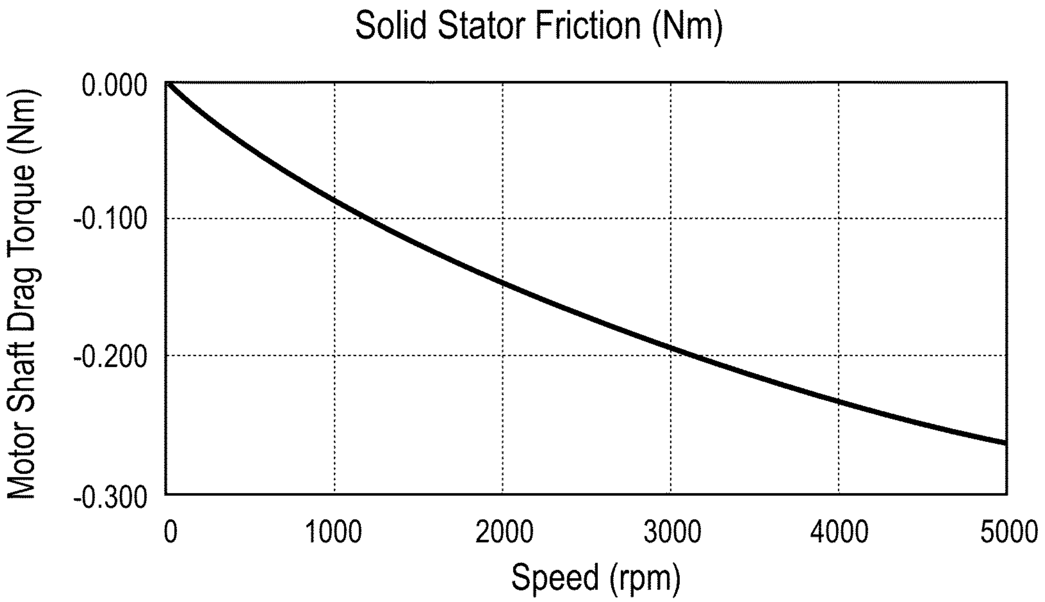

FIG. 8(*a*) shows the drag torque from one motor as a function of motor speed for a design using prior art electrical steel laminations for the stator of the motors of the arrangements of FIGS. 1 and 2 against an equivalent plot for a motor with a solid stator or non-electrical steel having the properties of FIGS. 6 and 7. As can be seen the motor with the solid stator provides considerably higher drag torques.

Suppose that a drag torque is required at the handwheel of 2 Nm at 180 degree/second (i.e., ½ turn of the handwheel per second) when the motors are unpowered.

Assume that there is a gearbox ratio of 20:1 and a gearbox efficiency 85%. The gearbox in this system is the connection of the motor shafts to the handwheel shaft.

There are two motors in the system which gives a target of 1 Nm per motor. In turn this equates to approx. 43 mNm drag torque per motor at 600 rpm.

The chosen reference electrical steel has low loss as shown in the curves of FIGS. 6 and 7. Whilst the drag torque is dependent upon the size of the motor, a motor built according to the prior art using the electrical steel of FIGS. 6 and 7 and could be anticipated from FIG. 8*a* to have a low drag torque of around 4 mNm at the motor shaft at 600 rpm. This would translate to a torque of 4 mNm×20/0.85≈0.10 Nm at the hand wheel. This is too low and does not provide the benefit of the claimed disclosure.

On the other hand, taking the example of FIG. 1 of a solid stator of carbon steel having the properties shown in FIGS. 6 and 7 the calculations reveal an approximate drag torque of 0.06×20/0.85≈1.4 Nm per motor. This would provide an excellent level of resistance to free movement of the handwheel. This can be tuned up or down through variations in the material used for the stator, switching to use more or fewer laminations, and introducing direct electrical paths between laminations through the use of welds or similar.

The invention claimed is:

1. A handwheel actuator assembly for a steer by wire system of a vehicle comprising:

a housing;

a shaft rotatably mounted with respect to the housing, the shaft connectable to a handwheel;

one or more motors each having a stator and a rotor, the stator carrying a plurality of phase windings and the rotor carrying a plurality of magnet poles and being connected to the shaft; and a control circuit adapted to control the current flowing into or out of the or each motor to cause a net torque to be applied to the shaft during normal operation, wherein the stator of at least one of the motors is configured such that in an event that the control circuit is powered down or disconnected and the handwheel is rotated at 180 degrees per second, a combination of motors overall provides a drag torque of at least 50 percent of the resistance to rotation of the shaft and a torque at the handwheel of at least 2 Nm.

2. A handwheel actuator assembly according to claim 1, wherein the stator of the motor is configured to cause the drag torque to be generated due to a combination of eddy current, hysteresis and other losses within the stator during use of the motor.

3. A handwheel actuator assembly according to claim 1, wherein at least one of the motors includes a stator that is constructed and arranged so that when compared with a stator made from a laminated structure consisting of 0.5 mm thick laminations of non-orientated electrical steel of grade M470-50A according to German (DIN) and European (EN)

standard DIN EN 10106:2016-03 and with laminations glued together, a drag torque is provided that is at least 5 times greater at 1000 rpm and 20 times greater at 2000 rpm of the motor.

4. A handwheel actuator assembly according to claim 1, wherein at least one of the motors is configured to so that the motors combined provide at least 60 percent of the resistance to rotation for at least one speed in the range.

5. A handwheel actuator assembly according to claim 1, wherein at least one of the motors is configured so that the combined motors provide substantially all of the drag torque over a range of non-zero rotational speeds.

6. A handwheel actuator assembly according to claim 1, wherein a single one of the motors is configured provide at least 2 Nm over a substantial range of non-zero rotational speeds of the handwheel.

7. A handwheel actuator according claim 1, including two motors where both the first motor and the second motor generate a significant drag torque such that the sum of the drag torque from both motors provides a substantial resistance to the turning of the handwheel when the motor is unpowered.

8. A handwheel actuator according to claim 1, including two motors where only one of the two motors generates a significant drag torque such that the sum of the drag torque from both motors provides a substantial resistance to the turning of the handwheel when the motor is unpowered.

9. A handwheel actuator according to claim 1, wherein the motor may comprise a brushless permanent magnet type motor comprising the rotor and the stator, wherein the stator has a plurality of windings surrounding regularly circumferentially spaced teeth.

10. A handwheel actuator assembly according to claim 1, wherein the stator comprises teeth which are solid and formed as a unitary element extending axially along the rotor and which are not laminated.

11. A handwheel actuator assembly according to claim 10 wherein the stator comprises two or more axially arranged laminations, each having a thickness measured axially of at least 1 mm or at least 2 mm or at least 4 mm or 5 mm.

12. A handwheel actuator assembly according to claim 1, wherein the stator comprises a material that has a specific total loss when excited with a sinusoidal flux density of amplitude 1 Tesla and frequency of 50 Hz greater than 30 W/kg, when tested according to the ASTM standard A927/A927M-11.

13. A handwheel actuator assembly according to claim 12, wherein the steel comprises a low silicon content steel with less than 1 percent silicon by weight.

14. A handwheel actuator assembly according to claim 1, further including a gearbox comprising a first gear fixed relative to the shaft and a second gear fixed relative to the output of the motor, rotation of the first gear causing a rotation of the second gear.

15. A handwheel actuator according to claim 14 further comprising a second gear connected to and configured to rotate with the shaft; and a second motor having an output driving a respective second output gear, the second output gear being engaged with the first gear and hence the shaft.

16. A handwheel actuator assembly according to claim 1, wherein the stator comprises a stack of laminations in which at least one lamination is connected electrically to an adjacent lamination or laminations.

17. A handwheel actuator assembly according to claim 16 wherein the laminations are connected by one or more weld lines that extend axially along the stator in a region where a substantial amount of current will flow axially along the weld lines.

18. A handwheel actuator assembly according to claim 10 wherein the stator comprises a set of teeth that project inwards from an outer restraining ring towards a rotor that is located concentric to the stator and inside the stator, the weld line or lines being formed on one or both sides of at least one tooth.

* * * * *